United States Patent

Asahara et al.

[11] Patent Number: 5,125,944
[45] Date of Patent: Jun. 30, 1992

[54] PROCESS FOR PRODUCING BURIED WAVE GUIDE DEVICE

[75] Inventors: Yoshiyuki Asahara, Mizuho; Shigeaki Ohmi, Tokorozawa; Hiroyuki Sakai, Fussa; Yoshitaka Yoneda, Akishima, all of Japan

[73] Assignee: Hoya Corporation, Tokyo, Japan

[21] Appl. No.: 766,066

[22] Filed: Sep. 27, 1991

Related U.S. Application Data

[60] Division of Ser. No. 617,268, Nov. 23, 1990, Pat. No. 5,078,772, which is a continuation of Ser. No. 330,946, Mar. 27, 1989, abandoned, which is a continuation-in-part of Ser. No. 159,605, Feb. 24, 1988, abandoned.

[30] Foreign Application Priority Data

Feb. 28, 1987 [JP] Japan .................. 62-46477

[51] Int. Cl.⁵ .................................. C03C 21/00
[52] U.S. Cl. .................... 65/30.13; 65/3.14; 65/116
[58] Field of Search .......... 65/30.13, 30.14, 116, 65/3.14

[56] References Cited

U.S. PATENT DOCUMENTS 4,756,733  7/1988  Houde-Walter et al. ........ 65/30.13
4,844,724  7/1989  Sakai et al. .................... 65/30.13

OTHER PUBLICATIONS

Glass Science, Doremus, John Wiley & Son (1973), pp. 24-35.
Inorganic Glass Forming Systems by Rawson, Academic Press (1967) p. 163.

Primary Examiner—Kenneth M. Schor
Attorney, Agent, or Firm—Nixon & Vanderhye

[57] ABSTRACT

A buried wave guide device is produced by immersing a phosphate glass containing exchangeable ions in a molten salt. Ions are exchanged from the phosphate glass to give a wave guide whose refractive index increases sharply from a first surface to a maximum at a depth below the first surface then decreases gradually in the direction of the opposite surface.

6 Claims, 5 Drawing Sheets

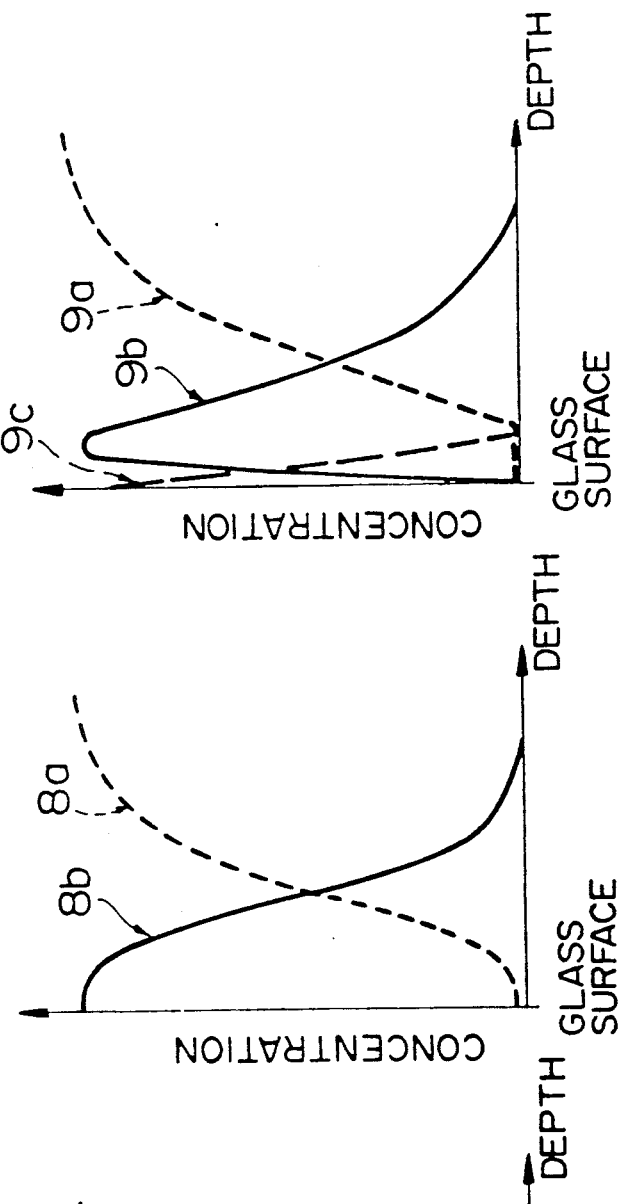

PROCESS FOR PRODUCING BURIED WAVE GUIDE DEVICE

CROSS-REFERENCE TO RELATED APPLICATIONS

This application is a division of earlier application Ser. No. 617,268, filed Nov. 23, 1990, now U.S. Pat. No. 5,078,772, which in turn is a continuation of earlier application Ser. No. 330,946 filed Mar. 27, 1989, now abandoned, which in turn is a continuation-in-part of application Ser. No. 159,605 filed Feb. 24, 1988, now abandoned.

BACKGROUND OF THE INVENTION

1. Field of the Invention

The present invention relates to a process for producing a buried wave guide device which is used for branching or coupling of a light in fields such as optical communication and the like.

2. Prior Art

A compared with optical circuits of microoptics type produced by combination with a micro lens, prism or optical fiber, optical circuits of wave guide type produced by allowing high refractive index ion(s) to diffuse into a portion of a substrate to form a wave guide or a lens in the substrate, are advantageous in that they require no alignment and are resistant to vibration because the wave guide and the lens are formed in one substrate. Accordingly, the wave guide type optical circuits are finding wide applications. As one of the wave guide type optical circuits, there is a branching circuit sing a wave guide (a slab wave guide), such as presented at the 4th Optical Meeting on Gradient Index Optical Imaging System (Jul. 4-5, 1983, Kobe) by K. Sano et al. The wave guide device 3 presented has a structure as shown in FIG. 5, in which a wave guide 4 is formed in the vicinity of the upper surface of a substrate, fiber arrays 5 and 6 are provided at the both ends of the wave guide 4 and thereby an optical signal emitted from one optical fiber at one end of the wave guide 4 can be divided into a plurality of optical fibers at the other end of the wave guide 4. This wave guide 3 has hitherto been produced by the following two steps. That is, a plate-like glass containing large amounts of alkali ion(s) (e.g. $Na^-$, $K^-$) is produced, a metal film is formed on the four side surfaces and the bottom surface of the plate-like glass according to a known method to mask the surfaces, then the plate-like glass is immersed in a molten salt containing compound(s) of ion(s) (e.g. $Ag^+$, $Tl^-$, $Li^-$) capable of giving high refractive index to the glass (said ion(s) being hereinafter referred to as "high refractive index ion(s)"), to allow these ion(s) to diffuse into the plate-like glass (the first step); subsequently, the plate-like glass is immersed in a molten salt containing compound(s) of ion(s) (e.g. $Na^-$, $K^-$) capable of giving low refractive index to the glass (said ion(s) being hereinafter referred to as "low refractive index ion(s)"), to ion exchange, at the peripheral portion of the glass, the ion(s) of high refractive index with the ion(s) of low refractive index (the second step); the first and second steps are effected while applying, if necessary, an electric field, whereby is obtained a buried wave guide device whose refractive index is maximum at the center of the wave guide and decreases gradually from the center to the peripheral portion of the wave guide. The above two-step method is explained further by referring to FIG. 6 showing the changes at each step, of the concentrations of ions in the plate-like glass. A plate-like starting glass having a uniform concentration $7a$ of alkali ion from the surface throughout the thickness $d_0$ as shown in FIG. 6(A) is masked at the four side surfaces and the bottom surface, then the glass is immersed in a molten salt containing compound(s) of high refractive index ion(s), whereby ion exchange takes place between the alkali ion(s) and the high refractive index ion(s) in the portion of the glass ranging from the upper surface to a desired depth and there is obtained a plate-like glass in which the alkali ion(s) concentration $8a$ and the high refractive index ion(s) concentration $8b$ vary from the surface toward the depth direction as shown in FIG. 6(B) (the first step); the plate-like glass is then immersed in a molten salt containing compound(s) of low refractive index ion(s), whereby ion exchange takes place between the high refractive index ion(s) and the low refractive index ion(s) in the vicinity of the upper surface of the glass and there is obtained a buried wave guide device in which the alkali ion(s) concentration $9a$, the high refractive index ion(s) concentration $9b$ and the low refractive index ion(s) concentration $9c$ vary from the upper surface toward the depth direction as shown in FIG. 6(C) and accordingly whose refractive index is maximum at a certain depth from the upper surface and gradually decreases from the depth to the peripheral portion (the second step).

As stated above, the conventional process for producing a buried wave guide device requires the two steps, i.e., the first step of allowing high refractive index ion(s) to diffuse into a plate-like starting glass and the second step of subjecting the high refractive index ion(s) already present in the glass to ion exchange with low refractive index ion(s). Therefore, the process is disadvantageous in requiring complex operation.

Hence, the object of the present invention is to provide a novel process for producing a buried wave guide device, which retains the advantages of the conventional diffusion and migration process (i.e., the resulting glass stably contains large amounts of high refractive index ion(s) and has a large difference in refractive index between the center and the peripheral portion of the glass), but is free from the complexity of the conventional diffusion and migration process and requires only one step of immersing a starting glass in a molten salt.

SUMMARY OF THE INVENTION

The present inventors made research in order to achieve the above object. As a result, it was found that a buried wave guide device consisting of a gradient refractive index type glass whose refractive index is maximum at a desired depth from the surface and decreases gradually from the depth to the peripheral portion, can be produced in one step by immersing a starting glass containing ion-exchangeable first ion(s) in a molten salt comprising not only compound(s) of second ion(s) capable of giving higher refractive index to the glass than the first ion(s) and capable of diffusing into the glass but also compound(s) of third ion(s) capable of giving lower refractive index to the glass and lower diffusion rate than the second ion(s). The above finding has led to the completion of the present invention.

Hence, the present invention provides a process for producing a buried wave guide device, which comprises immersing a starting glass containing ion-exchangeable first ion(s) in a molten salt comprising (a) compound(s) of second ion(s) capable of giving higher refractive index to the glass than the first ion(s) and capable of diffusing into the glass and (b) compound(s) of third ion(s) capable of giving lower refractive index to the glass than the second ion(s) and capable of diffusing into the glass at a lower rate than the second ion(s), to effect ion exchange in the starting glass and thereby to obtain a buried wave guide device consisting of a gradient refractive index type glass whose refractive index is maximum at a desired depth from the surface and decreases gradually from the depth to the peripheral portion.

The preferred embodiments of the present invention are as follows. (1) The ion-exchangeable first ion(s) contained in the starting glass are alkali ion(s) such as $Na^+$, $K^+$, $Li^+$ and the like.

(2) $Ag^+$ is used as the second ion(s) capable of giving higher refractive index to the glass than the first ion(s) and capable of diffusing into the starting glass.

(3) In the above (2), as the third ion(s) capable of giving lower refractive index to the glass than the second ion(s) and capable of diffusing into the starting glass at a lower rate than the second ion(s), there are used divalent ion(s) e.g., $Mg^{++}$, $Ca^{++}$, $Ba^{++}$, $Cd^{++}$, $Sr^{++}$, $Pb^{++}$, $Zn^{++}$ and particularly $Sr^{++}$, $Pb^{++}$, or alkali ion(s) (e.g. $Na^+$, $K^+$, $Li^+$, $Cs^+$ and particularly $K^+$, $Cs^+$) same as or different from the first ion(s) contained in the starting glass.

(4) $Tl^+$ is used as the second ion(s).

(5) In the above (4), as the third ion(s), there are used divalent ion(s) e.g., $Mg^{++}$, $Ca^{++}$, $Ba^{++}$, $Cd^{++}$, $Sr^{++}$, $Pb^{++}$, $Zn^{++}$).

(6) The molten salt is a nitrate, a sulfate, a chloride, a carbonate or the like, particularly a nitrate.

(7) The first ion(s) are alkali ion(s) and the third ion(s) are also alkali ion(s).

(8) In the above (7), the first ion(s) and the third ion(s) are same alkali ion(s). (9) In the above (7), the first ion is $Na^+$ and the third ion is $K^+$ or $Cs^+$.

BRIEF DESCRIPTION OF THE DRAWINGS

FIGS. 6(A), 6(B) and 6(C) are graphs showing the concentration distributions of ions at each step, in the plate-like glass in the conventional two-step process.

DETAILED EXPLANATION OF THE INVENTION

Figure 1A:
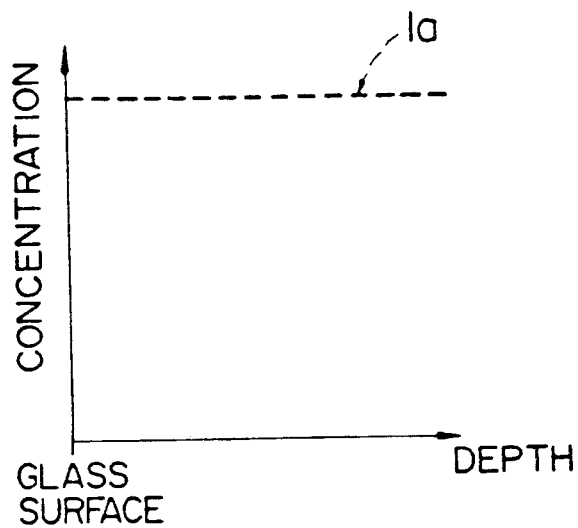
FIGS. 1(A) and 1(B) are graphs showing the concentration distributions of ions in the plate-like glass before and after the treatment of the present invention.

The present invention is described in detail by referring to the drawings.

Figure 1B:
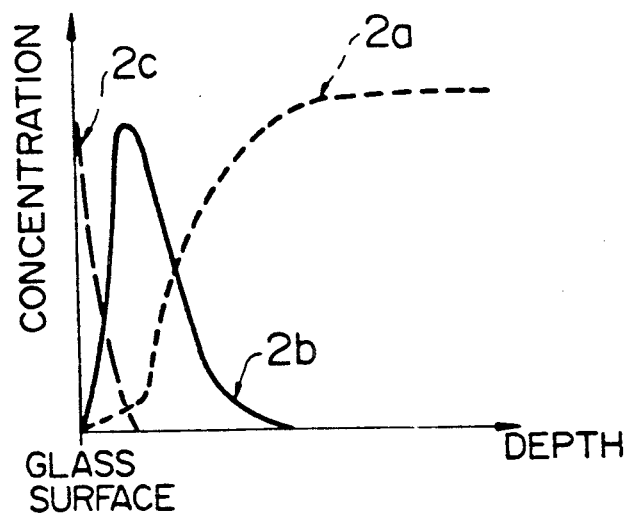
Figure 2A:
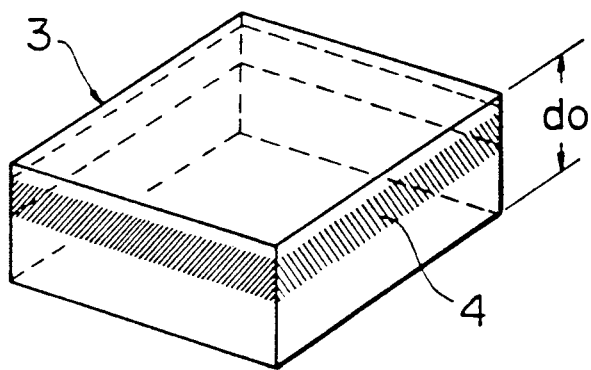
FIG. 2(A) is a perspective view of the buried wave guide device obtained according to the present process and FIG. 2(B) is a graph showing the distribution of refractive index in the device.

FIGS. 1(A) and 1(B) show the concentration distributions of ions in the plate-like glass having a thickness $d_0$ and a rectangular parallelepiped shape as shown in FIG. 2(A), before and after the treatment of the present invention.

In the present process, a plate-like glass containing large amounts of first ion(s) produced according to the melting process is used as a starting glass. In concentration of the first ion(s) in the starting glass is uniform throughout the glass thickness $d_0$ including the glass surface, as shown by the dotted line 1a of FIG. 1(A).

The four side surfaces and the bottom surface of the plate-like starting glass having a thickness $d_0$ is covered with a metal film according to a given method to mask said surfaces and then ion exchange is effected only at the upper surface of the starting of glass, whereby is produced a buried wave guide device 3 having a wave guide 4 in the vicinity of the upper surface of the plate-like glass, as shown in FIG. 2(A). (Incidentally, the above masking is optional and therefore the process can be effected without conducting the masking. An example of the process without conducting the masking is described later as Example 2.)

Figure 2B:
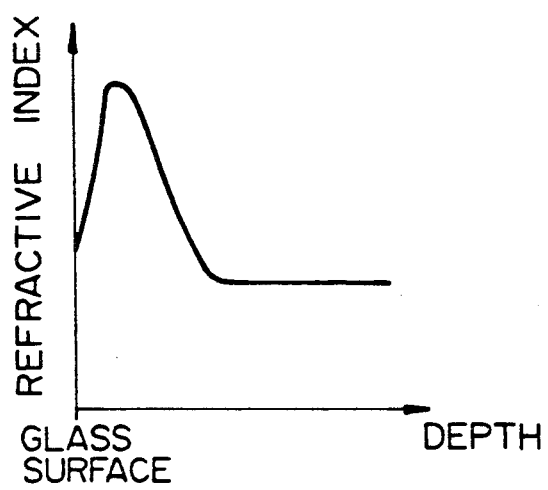

In the conventional two-step process, a plate-like glass containing first ion(s) is immersed in a molten salt comprising compound(s) of second ion(s) capable of giving higher refractive index to the glass than the first ion(s) and capable of diffusing into the glass at a high rate, to effect ion exchange between the first ion(s) in the glass and the second ion(s) in the molten salt at temperatures around the transition temperature of the glass, whereby is obtained in an appropriate time a plate-like glass in which the second ion(s) concentration 8b varies from the surface toward the direction of the depth as shown in FIG. 6(B) (the first step); and in order to produce a buried wave guide device from the plate-like glass, it is required to conduct the second step of immersing the glass in a molten salt comprising compound(s) of third ion(s) capable of giving of lower refractive index to the glass than the second ion(s). Mesnwhile in the process of the present invention, there is used a molten salt comprising not only the above mentioned second ion(s) but also third ion(s) capable of giving lower refractive index to the glass than the second ion(s) and capable of diffusing into the starting glass at a lower rate than the second ion(s) (an example of the third ion(s) is an alkali ion other than the alkali ion(s) contained in the starting glasses; for instance, when the alkali ion contained in the starting glass is $Na^+$, the third ion is $K^+$ or $Cs^+$), in the form of compounds such as sulfate, nitrate, chloride, carbonate and the like; consequently, there occur, during the immersion of the starting glass in the above molten salt, an ion exchange between the first ion(s) and the second ion(s) and, at a delayed timing, an ion exchange between the first ion(s) and the third ion(s) or between the previously diffused second ion(s) and the third ion(s) and there is obtained in one step a buried wave guide device consisting of a gradient refractive index type glass in which, as shown in FIG. 1(B), the concentration 2b of the second ion(s) increases sharply from the upper surface of the glass toward the depth direction, reaches a peak at a desired depth and thereafter decreases gradually toward the depth direction and the concentration 2c of the third ion(s) is high at the upper surface and decreases sharply toward the depth direction. In FIG. 1(B), 2a is the concentration of the first ion(s) remaining in the buried wave guide device. As a result, there is obtained a buried wave guide device consisting of a plate-like glass whose refractive index, as shown in FIG. 2(B), increases sharply from the upper surface of the glass toward the depth direction, reaches a peak at a desired depth and thereafter decreases gradually toward the depth direction. This buried wave guide device 3 has a wave guide 4 in the vicinity of the upper surface, as shown in FIG. 2(A).

In the above, there was explained a case the alkali ion(s) in the plate-like starting glass and the alkali ion(s) in the molten salt are different. However, the third ion(s) can be same as the ion(s) originally present in the starting glass and it gives no problem for the practice of the present process. The amount of the ions contained in the molten salt are controlled so that the ions can diffuse into the glass according to a chemical equilibrium.

The present invention is explained in more detail on the basis of the following Examples.

EXAMPLE 1

Figure 3A:
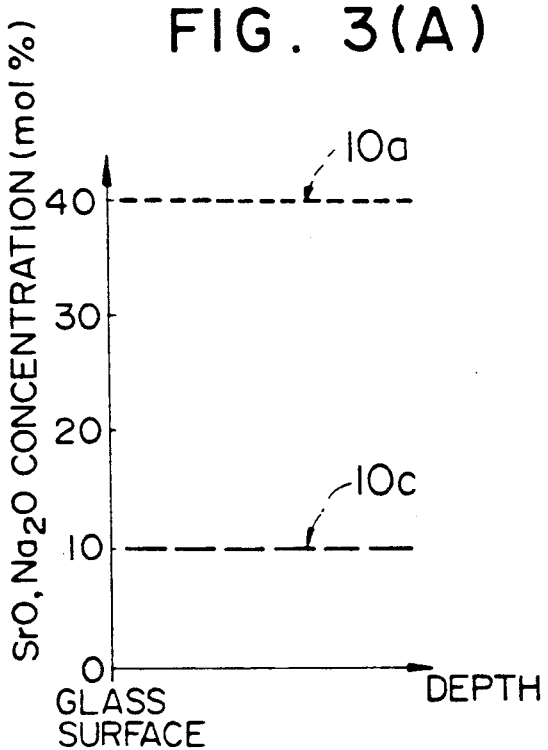
FIGS. 3(A) and 3(B) are graphs showing the concentration distributions of ions in the plate-like glass before and after the treatment of Example 1.
Figure 3B:
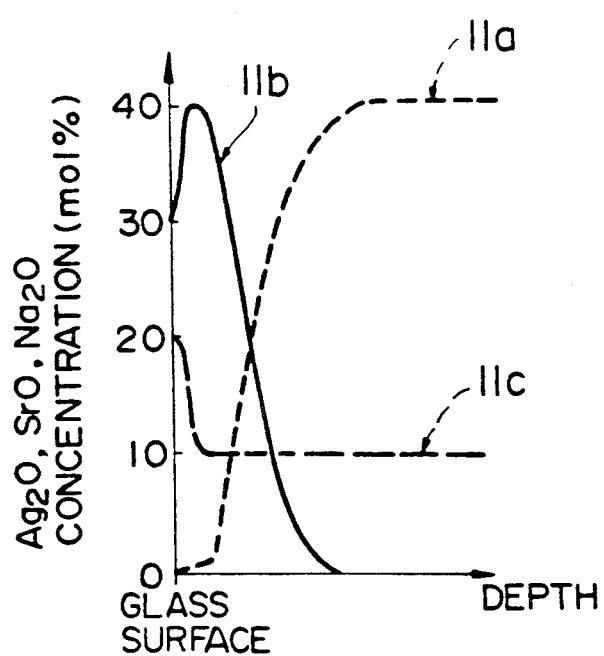

As a shaped starting glass, there was used a plate-like glass of 5 mm in thickness, 2 mm in width and 50 mm in length, consisting of a phosphate glass containing 40 mole % or $Na_2O$ and 10 mole % of SrO and having a glass transition temperature of 510° C. The concentration of $Na_2O$ in the plate-like glass in the depth direction was uniform at 40 mole % as shown by the straight line 10a of FIG. 3(A). The concentration of SrO was also uniform at 10 mole % as shown by the straight line 10c. The bottom surface and the four side surfaces of the plate-like glass was covered with a titanium film having good acid resistance and good alkali resistance, according to the vacuum deposition method to mask the surfaces. Then, the plate-like glass was immersed in a molten salt consisting of 5% by weight of $AgNO_3$, 20% by weight of $Sr(NO_3)_2$ and 75% by weight of $CsNO_3$, at a temperature (435° C.) around the strain point to the transition temperature of the glass for 2 hours, whereby $Ag^+$ diffused into the glass from the upper surface to the depth of about 100 μm. As shown by the curve 11b of FIG. 3(B), the $Ag_2O$ concentration was 30 mole % at the glass upper surface, reached a peak of 40 mole % (the depth at this concentration was about 10 μm), thereafter decreased gradually, and was almost 0 mole % at around a depth of 100 μm.

Menwhile, $Sr^{++}$ having a lower diffusion rate than $Ag^+$ diffused into the glass from the upper surface to the depth of 10 μm. As shown by the curve 11c of FIG. 3(B), the SrO concentration was 20 mole % at the glass upper surface, decreased sharply up to around a depth of 10 μm, and thereafter was constant at 10 mole % toward the depth direction. $Cs^+$ having a lower diffusion rate than $Sr^{++}$ did not substantially take part in ion exchange in 2 hours. The $Na^+$ originally present in the portion of the starting glass from the upper surface to the depth of about 10 μm was substituted with $Ag^+$ and $Sr^{++}$ almost completely and the $Na_2O$ concentration in said glass portion became substantially zero, as shown by the curve 11a of FIG. 3(B). In the wave guide device thus formed, the center of the wave guide (i.e., the depth of 10 μm from the glass upper surface) had a refractive index of 1.88 and the lower refractive index layer formed in the vicinity of the glass upper surface has a refractive index of 1.80. Refractive index decreased from the center of the wave guide toward the depth direction and was 1.68 at a depth of 100 μm.

EXAMPLE 2

Figure 4A:
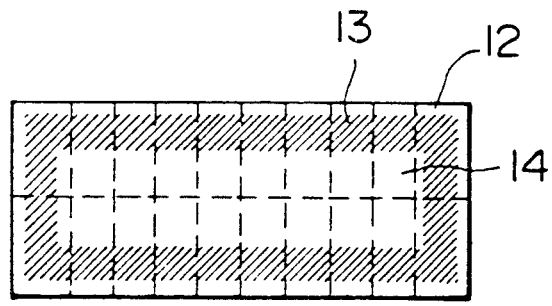
FIGS. 4(A) and 4(B) are views showing the gradient refractive index type plate-like glass obtained in Example 2 and the buried wave guide device obtained from the glass, respectively.
Figure 4B:
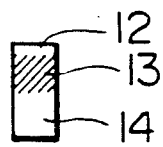
Figure 5:
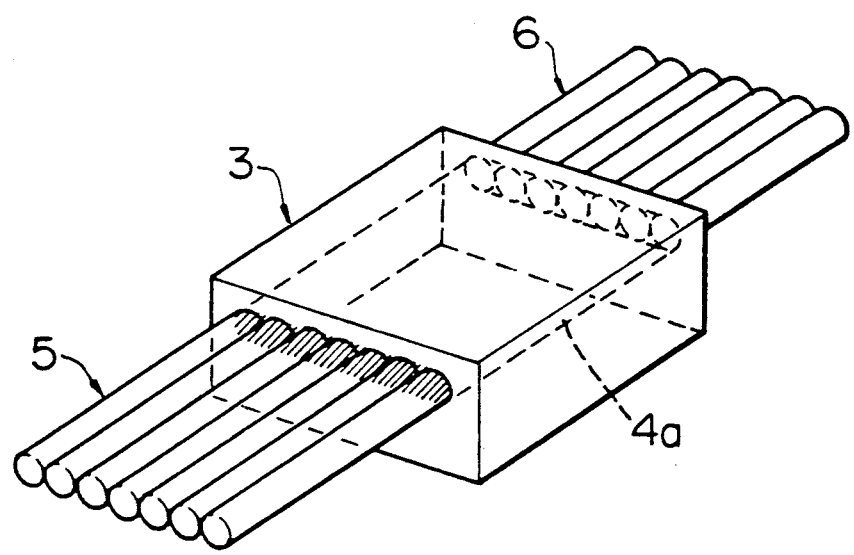
FIG. 5 is a view showing a state in which a buried wave guide device is used.

As a shaped starting glass, there was used a plate-like glass of 5 mm in thickness, 42 mm in width and 50 mm in length, consisting of the same phosphate as in Example 1. Without being masked, the plate-like glass was imersed in the same molten salt as in Example 1 at the same temperature as in Example 1 for the same length of time as in Example 1. The resulting plate-like glass had the same refractive index distribution as that of Example 1, in the depth direction and, as shown in FIG. 4(A), had a low refractive index layer 12 in the vicinity of the upper surface, a high refractive index layer 13 below the layer 12 and a low refractive index layer 14 below the layer 13. The plate-like glass was cut along the dotted lines of FIG. 4(A) and the surfaces of each resulting rectangular parallelepiped were ground and polished to obtain 16 buried wave guide devices each of 2 mm in thickness, 2 mm in width and 50 mm in length as shown in FIG. 4(B).

EXAMPLE 3

As a shaped starting glass, a plate-like glass of 5 mm in thickness, 2 mm in width and 500 mm in length, was used consisting of a phosphate glass containing 30 mol % of $Na_2O + K_2O$ and having a glass transition temperature of 507° C.

The plate-like glass was covered with a titanium film in the same manner as in Example 1. Then, the plate-like glass was immersed into a molten salt consisting of 20% by weight of $TlNO_3$ and 80% by weight of $Ba(NO_3)_2$ at 400° C. for 53 hours, whereby $Tl^+$ diffused into the glass from the upper surface to the depth of about 100 μm. The concentration of $Tl^+$ was maximum at a depth of 13 μm from the glass surface.

Meanwhile, $Ba^{2+}$ having a lower diffusion rate than $Tl^+$ diffused into the glass from the upper surface to the depth of 13 μm. The concentration of $Ba^{2+}$ was maximum at the glass upper surface.

In the wave guide device thus formed, the center of the wave guide (i.e., the depth of 13 μm from the glass upper surface) had a refractive index of 1.79 and the lower refractive index layer formed in the vicinity of the glass upper surface had a refractive index of 1.69. The refractive index decreased from the center of the wave guide toward the depth direction and was 1.62 at a depth of 100 μm or more.

As described in detail above, according to the present invention there can be produced, only in one step of immersing a particular glass in a particular molten salt, a buried wave guide device consisting of a glass stably containing large amounts of high refractive index ion(s) and having such a great refractive index difference between the center and the peripheral portion of the wave guide.

What is claimed is:

1. A process for producing a buried wave guide device having a first surface and a second surface which is parallel to and opposite the first surface, which process comprises immersing a phosphate glass containing ion exchangeable first ions consisting of alkali ions in a molten salt comprising:
   (a) at least one compound of a second ion consisting of $Tl^+$ which $Tl+$ is capable of giving a higher refractive index to the glass than the first ions give to the glass and is also capable of diffusing into the glass, and
   (b) at least one compound of a third ion, the third ion being a divalent ion and being capable of giving a lower refractive index to the glass than the second ion gives to the glass and also capable of diffusing into the glass at a lower rate than the second ion, to effect ion exchange in the phosphate glass and thereby to obtain a buried wave guide which has a wave guide between the first and second surfaces of the glass and whose refractive index increases sharply from the first surface of the glass to a maximum at a predetermined depth int eh vicinity of the first surface and thereafter decreases gradually in the direction of the second surface.

2. A process according to claim 1, wherein the ion of the alkali ions of the first ions is selected from the group consisting of $Na^-$, $K^-$, $Li^-$ and mixtures thereof.

3. The process according to claim 1, wherein the divalent ion is selected from the group consisting of $Mg^{--}$, $Ca^{--}$, $Ba^{--}$, $Cd^{--}$, $Sr^{--}$, $Pb^{--}$, $Zn^{--}$ and mixtures thereof.

4. The process according to claim 1, wherein the molten salt is selected from the group consisting of nitrates, sulfates, chlorides and carbonates.

5. The process according to claim 1, wherein the refractive index is maximum in substantially the half of the glass nearest the first surface.

6. The process according to claim 5, wherein the glass is a rectangle and the refractive index is maximum about 10 microns below the first surface of the glass.

* * * * *